(12) United States Patent
Utsunomiya et al.

(10) Patent No.: US 8,397,921 B2
(45) Date of Patent: Mar. 19, 2013

(54) SCUM REMOVING APPARATUS (75) Inventors: Hideo Utsunomiya, Tokyo (JP); Takao Abe, Matsudo (JP); Kouji Tanaka, Tokyo (JP)

(73) Assignee: Utsunomiya Kogyo Co., Ltd., Tokyo (JP)

( * ) Notice: Subject to any disclaimer, the term of this patent is extended or adjusted under 35 U.S.C. 154(b) by 270 days.

(21) Appl. No.: 12/682,626

(22) PCT Filed: Oct. 12, 2007

(86) PCT No.: PCT/JP2007/069965
§ 371 (c)(1),
(2), (4) Date: Jun. 4, 2010

(87) PCT Pub. No.: WO2009/047864
PCT Pub. Date: Apr. 16, 2009

(65) Prior Publication Data
US 2010/0236999 A1    Sep. 23, 2010

(51) Int. Cl.
*B01D 21/24* (2006.01)
(52) U.S. Cl. .......................... 210/523; 210/525; 210/540
(58) Field of Classification Search .................. 210/523, 210/525, 540, 242.3, 776
See application file for complete search history.

(56) References Cited

U.S. PATENT DOCUMENTS

| | | | | |
|---|---|---|---|---|
| 2,242,139 A | * | 5/1941 | Munroe | 210/540 |
| 3,147,221 A | * | 9/1964 | Johnston | 210/525 |
| 3,204,773 A | * | 9/1965 | Lind | 210/525 |
| 3,726,406 A | * | 4/1973 | Damberger | 210/242.3 |
| 3,762,169 A | * | 10/1973 | Graham | 210/776 |
| 3,847,815 A | * | 11/1974 | Chastan-Bagnis | 210/776 |
| 4,358,374 A | * | 11/1982 | Morva et al. | 210/242.3 |
| 4,618,430 A | * | 10/1986 | Favret et al. | 210/776 |
| 5,089,118 A | * | 2/1992 | Mahoney | 210/523 |
| 5,108,600 A | * | 4/1992 | Rees et al. | 210/242.3 |
| 5,445,744 A | * | 8/1995 | Pettersen | 210/776 |

FOREIGN PATENT DOCUMENTS

| | | |
|---|---|---|
| JP | 53-035476 U | 3/1978 |
| JP | 56-84684 A | 7/1981 |
| JP | 61-115194 U | 7/1986 |
| JP | 63-149296 U | 9/1988 |
| JP | 4-313386 A | 11/1992 |
| JP | 7-299493 A | 11/1995 |
| JP | 9-19682 A | 1/1997 |
| JP | 9-276860 A | 10/1997 |

(Continued)

OTHER PUBLICATIONS

International Search Report directed to International Application No. PCT/JP2007/069965, dated Jan. 29, 2008, 3 pages.

(Continued)

*Primary Examiner* — Christopher Upton
(74) *Attorney, Agent, or Firm* — Smith Patent Office (57) ABSTRACT

A spraying means is arranged on the scum-flowing wall surface side of wall surfaces forming a scum inlet of a scum discharging mechanism. The spraying means sprays pressured water upward along the wall surface on the scum-flowing side from when a part of the scum inlet is submerged in water until the scum begins to flow into the scum inlet. As a result, even large lumps of scum exceeding 10 cm in thickness (diameter) may be lead smoothly into a pipe by the pressured water, and the amount of discharged water accompanying scum discharge may be reduced to $\frac{1}{20}$ to $\frac{1}{30}$ than by a conventional scum removing apparatus.

16 Claims, 8 Drawing Sheets

FOREIGN PATENT DOCUMENTS

| | | | |
|---|---|---|---|
| JP | 11-128916 | A | 5/1999 |
| JP | 2000-202436 | A | 7/2000 |
| JP | 2004-202493 | A | 7/2004 |
| JP | 3943551 | B2 | 4/2007 |

OTHER PUBLICATIONS

Special Issue of "Journal of Sewerage, Monthly", vol. 29, No. 4, p. 71, issued on Feb. 28, 2006.

* cited by examiner

SCUM REMOVING APPARATUS

TECHNICAL FIELD

The present invention relates to a scum removing apparatus for removing scum generated at a water treatment plant such as a settling basin at a sewage-treatment plant, for example. More specifically, it relates to an apparatus which can improve scum mobility so as to efficiently discharge scum.

BACKGROUND ART

Conventionally, scum generated on the water surface of a settling basin is removed by a scum removing apparatus provided on the downstream side of the settling basin. As shown in FIG. 4 of Japanese Patent Application Publication Laid-open No. Hei 9-19682, for example, a scum removing apparatus, which includes a tubular scum discharging mechanism constituted by a pipe having an axial center direction parallel to the water surface, including a slender opening in the axial center direction (longitudinal direction), and the pipe can rotate with the axis as a center, wherein that pipe is rotated at the time of discharging scum such that a part of the opening is positioned below water so as to introduce the scum into the pipe from the opening and discharge it, is well-known as such a scum removing apparatus. In addition, as disclosed in FIG. 1 of Japanese Patent Application Publication Laid-open No. Hoi 9-19682 and Japanese Patent Application Publication Laid-open No. 2000-202436, a scum removing apparatus, which is constituted by a trough including a vertically moving inflow floodgate, wherein the top end of the inflow floodgate of the trough is positioned below water at the time of discharging scum so as to introduce the scum into the trough via the inflow floodgate and discharge it, is also well-known.

However, the conventional scum removing apparatuses have shortcomings in that while scum near the opening and the inflow floodgate flows into the trough immediately after the pipe opening and the trough inflow floodgate are positioned below water, marginal scum flows into the pipe and trough thereafter together with a large quantity of water, requiring a long time for removing all of the scum, and thereby requiring a large quantity of water for removing the scum as a result.

More specifically, there are shortcomings in that since the scum generating and floating on the water surface takes on a single large plate shape with a constant thickness, hardness, and adherence (adhesion), a side of that plate-shaped scum adheres to the pipe and the trough and other sides respectively adhere to basin walls before the pipe or the trough operate. Therefore, while a part of the scum near the pipe and the inflow floodgate (trough) flows into the pipe via the opening and the inflow floodgate in sync with the operation of the pipe and the inflow floodgate, it is easy for only water to flow into the pipe and the trough thereafter, not allowing all of the scum to be removed in a short period of time. Moreover, when a large amount of water has flowed into the pipe and the trough, there is a shortcoming in that processing load of the scum processing equipment increases thereafter.

Furthermore, as disclosed in Japanese Patent Application Publication Laid-open No. Hei 9-276860, for example, the conventional scum removing apparatus also sprays pressured water at an oblique angle on top of the scum in order to provide locomotive faculty to move the scum toward the pipe or trough side in sync with movement of the pipe opening to below water or in sync with movement of the trough inflow floodgate to below water. However, the conventional scum discharging method of moving scum using only the flow of water has shortcomings in that electric power is consumed wastefully and power cost increases since only water flows into the pipe and the trough, this inflowing water is sent back to the settling basin, and the sent-back water is then pumped back up to the water treatment plant.

The applicant has already provided a scum removing apparatus in Japanese Patent No. 3943551 to solve the above-given shortcomings. The scum removing apparatus according to this patent (hereafter referred to as 'patent apparatus') allows the scum in the basin to smoothly flow into a scum inlet and effectively discharge the scum by smooth transfer of all of the scum.

In other words, the patent apparatus is a scum removing apparatus, which transfers generated scum on a current to the scum discharging mechanism side, and submerges a part of the scum inlet of the scum discharging mechanism under water at the time of discharging scum so as to remove the generated scum. The scum removing apparatus is characterized in that it is provided on the scum-flowing wall surface side of wall surfaces forming the scum inlet of the scum discharging mechanism, and a spraying means for spraying, for example, fluid (air) made of compressed air upward is provided along the wall surface.

Moreover, the patent apparatus is characterized in that it is also provided with a spraying means on the basin wall side in the water near the basin wall further upstream than the position at which the scum discharging mechanism is provided, wherein the spraying means sprays air upward along the basin wall. In addition, the patent apparatus is characterized in that it is provided with a water spraying means, which is provided further upstream than the position at which the scum discharging mechanism is provided, wherein the water spraying means sprays water obliquely downward on the scum discharging mechanism side to transfer the scum to the scum discharging mechanism side by the spraying pressure of the water.

The patent apparatus with the above configuration allows rapid discharge of scum since the scum may easily flow into the scum inlet and transfer of all of the scum can be performed smoothly. As a result, the patent apparatus may reduce amount of water flow accompanying scum discharge to $\frac{1}{20}$ to $\frac{1}{30}$ than by the conventional scum removing apparatus. As such, since the amount of water accompanying the scum to be discharged is far less than in the past, the patent apparatus has merits of reduction in equipment expenses for post-processing equipment such as a pressure flotation device, and reduction in power consumption of a lifting pump, thereby allowing contribution to energy conservation.

A verification test conducted at an actual certain sewage plant using the patent apparatus will be described. The scum removing apparatus provided with a tubular scum discharging mechanism used in this verification test has a 5 m-long pipe opening. When scum has grown to a thickness of 7 to 10 cm and to a length of 5 m further upstream from the pipe, the scum may be completely discharged by submerging a part of the pipe opening for 5 to 7 minutes. Moreover, in a verification test at another sewage plant, complete removal of scum by submerging a part of the pipe opening for 5 minutes every 24 hours and 5 minutes every 36 hours has been confirmed. As a result, the patent apparatus is given the nickname 'Once-a-week boy' since submerging a part of the pipe opening for approximately 10 minutes just once a week is sufficient, and has been introduced in the 'Special Issue of Monthly Journal of Sewerage (P. 71)' issued on Feb. 28, 2006.

DISCLOSURE OF INVENTION

Problems to be Solved by the Invention

However, when large lumps of scum exceeding 10 cm in diameter exist on the scum inlet side of the patent apparatus, the scum cannot be raised to the edge of the scum inlet by the force of air even if fluid of air is sprayed upward, and therefore the scum cannot flow into the pipe smoothly, becoming a possible obstacle in discharging scum.

Such large lumps of scum easily generate particularly during heavy rain and in the case of combined sewage where sewage water and rain water collect in the same pipe and flow into the sewage plant. Moreover, such large lumps of scum result from sludge, which contains oil and fat content included in sewage, adhering to the sewage piping inner surface and growing there to form into an oil ball, or formed by organic matter in the sludge remaining in an anaerobic condition. Such scum then separates from the sewage piping inner surface due to water pressure or current during heavy rain and drifts into the sewage plant in large lumps.

Since aside from during heavy rain, the patent apparatus normally does not have any large lumps of scum exceeding 10 cm in diameter (thickness) on the scum inlet side, it can make the scum flow smoothly into the pipe by raising the scum to the edge of the scum inlet only by force of air. However, after heavy rain, as described above, there may be times when large lumps of scum exist, becoming a possible obstacle in discharging scum.

Furthermore, with conventional scum removing apparatus including the patent apparatus, a part of the scum passes through the lower side of the pipe, namely a part of the scum travels around the lower side of the scum discharging mechanism and mixes into treated water, and thereby could lead to degradation of quality of the treated water.

As a result, the present invention is devised to resolve these shortcomings. Objectives thereof are to provide a scum removing apparatus that, even when there are large lumps of scum exceeding 10 cm in diameter on the scum inlet side, can raise the large lumps of scum up to the edge of the scum inlet so as for them to flow smoothly into the pipe, and provide a scum removing apparatus that does not allow degradation of treated water quality due to a part of the scum traveling around the lower side of the scum discharging mechanism and mixing into the treated water.

Means of Solving the Problems

To achieve the above-mentioned objectives, a scum removing apparatus according to the present invention is characterized in that it transfers generated scum on a current to a scum discharging mechanism side, and has a part of a scum inlet of the scum discharging mechanism submerged in water at the time of discharging scum so as to remove the generated scum. The scum removing apparatus comprises a spraying means on the scum-flowing wall surface side of wall surfaces forming the scum inlet of the scum discharging mechanism, wherein the spraying means sprays pressured water upward along the wall surface on the scum-flowing side from when a part of the scum inlet is submerged in water until the scum begins to flow into the scum inlet.

Moreover, the present invention is characterized in that it further includes a spraying means on the scum-flowing wall surface side of wall surfaces forming the scum inlet of the scum discharging mechanism, wherein the spraying means sprays pressured water upward along the wall surface on the scum-flowing side from when a part of the scum inlet is submerged in water, and air is sprayed along the wall surface on the scum-flowing side for a predetermined period, until the scum begins to flow into the scum inlet.

Furthermore, the present invention is characterized in that it is also provided with a spraying means on the basin wall side in the water near the basin wall further upstream than the position at which the scum discharging mechanism is provided, and sprays air upward along the basin wall.

The present invention is further characterized in that spraying of air by the air spraying means is performed regularly.

In addition, the present invention is characterized in that it is provided with a water spraying means, which is provided further upstream than the position at which the scum discharging mechanism is provided, and sprays water obliquely downward on the scum discharging mechanism side at the time of discharging scum to transfer the scum to the scum discharging mechanism side by the spraying pressure of the water.

The present invention is further characterized in that the scum discharging mechanism is a tubular scum discharging mechanism or a trough-type scum discharging mechanism.

The present invention is further characterized in that it includes a blocking board, which either extends downward for a predetermined distance along the length of the bottom of a pipe of the tubular scum discharging mechanism, or extends downward for a predetermined distance along the length of the bottom of a trough of the trough-type scum discharging mechanism.

The present invention is yet even further characterized in that spraying of air by the spraying means is performed from small holes formed in the lower portion of an air supply pipe at constant predetermined intervals along the length thereof.

The present invention is yet even further characterized in that the spraying means includes small holes formed in the upper portion of an air supply pipe at predetermined intervals along the length thereof, and covers are provided above the small holes at predetermined intervals.

The present invention is yet even further characterized in that spraying of water by the water spraying means is performed from nozzles formed with a flat and broadening outer shape, and structured so as to pump up water from a middle layer in the basin.

Alternatively, to achieve the above-mentioned objectives, a scum removing apparatus according to the present invention is characterized in that it transfers generated scum on a current to a scum discharging mechanism side, and has a part of a scum inlet of the scum discharging mechanism submerged in water at the time of discharging scum so as to remove the generated scum. The scum discharging mechanism includes either a tubular scum discharge mechanism, which includes a pipe having an axial center direction parallel to the water surface and being rotatable with the axis as a center and a slender opening in the axial center direction, and introduces scum into the pipe from the opening when a part of the opening is positioned below water, or a trough-type scum discharging mechanism, which introduces scum from a vertically moving inflow floodgate into the trough when the upper part of the inflow floodgate is positioned below water. The scum discharging mechanism further includes a blocking board, which either extends downward for a predetermined distance along the length of the bottom of a pipe of the tubular scum discharging mechanism, or extends downward for a predetermined distance along the length of the bottom of a trough of the trough-type scum discharging mechanism.

Effects of Invention

Since the present invention includes a spraying means, which is provided on the scum-flowing wall surface side of wall surfaces forming a scum inlet of a scum discharging mechanism, and sprays pressured water upward along the wall surface on the scum-flowing side from when a part of the scum inlet is submerged in water until the scum begins to flow into the scum inlet, even when there are large lumps of scum exceeding 10 cm in diameter, the large lumps of scum may be raised to the edge of the scum inlet by the sprayed flow of water so as to flow smoothly into the scum inlet, thus allowing rapid discharge of scum.

Moreover, since the present invention includes a spraying means, which is provided on the scum-flowing wall surface side of wall surfaces forming the scum inlet of the scum discharging mechanism, and sprays pressured water upward along the wall surface on the scum-flowing side from when a part of the scum inlet is submerged in water, and air is sprayed along the wall surface on the scum-flowing side for a predetermined period, until the scum begins to flow into the scum inlet, the scum strips away from wall surfaces by the air, and the stripped away scum smoothly flows into the scum inlet by the sprayed water flow.

Furthermore, since the present invention is also provided with an air spraying means in the water near the basin wall further upstream than the position at which the scum discharging mechanism is provided, and sprays air upward along the basin wall, there is no more adherence of scum to the basin walls due to the air, and thereby allowing efficient transfer of the scum to the scum discharging mechanism side.

Yet even further, since the present invention performs spraying of air by the air spraying means regularly, there is no more adherence of scum to the basin walls due to the air, and thereby allowing efficient transfer of the scum to the scum discharging mechanism side.

In addition, since the present invention is provided with a water spraying means further upstream than the position at which the scum discharging mechanism is provided, and sprays water obliquely downward on the scum discharging mechanism side at the time of discharging scum to transfer the scum to the scum discharging mechanism side by the spraying pressure of the water, transfer of scum may be expedited.

Moreover, since the scum discharging mechanism is either a tubular scum discharging mechanism or a trough-type scum discharging mechanism according to the present invention, the scum discharging mechanism may be easily implemented, and the present invention may also be easily implemented into the existing scum discharging mechanism.

Furthermore, since the present invention further includes a blocking board, which either extends downward for a predetermined distance along the length of the bottom of a pipe of the tubular scum discharging mechanism, or extends downward for a predetermined distance along the length of the bottom of a trough of the trough-type scum discharging mechanism, traveling around of scum may be effectively prevented, and degradation of treatment water quality may be prevented.

Yet even further, since the present invention performs spraying of air by the spraying means from small holes formed in the lower portion of an air supply pipe at constant predetermined intervals along the length thereof, the small holes may be kept from clogging.

Yet even further, since the spraying means includes small holes formed in the upper portion of an air supply pipe at predetermined intervals along the length thereof, and covers are provided above the small holes at predetermined intervals, the present invention may effectively prevent the small holes from clogging.

Since spraying of water by the water spraying means is performed from nozzles formed with a flat and broadening outer shape, and structured so as to pump up water from a middle layer in the basin, the present invention allows easy spraying of water, dispersion of pressured water across a wide area of scum, and effective transfer of the scum.

Furthermore, since the scum discharging mechanism further includes a blocking board, which either extends downward for a predetermined distance along the length of the bottom of a pipe of the tubular scum discharging mechanism, or extends downward for a predetermined distance along the length of the bottom of a trough of the trough-type scum discharging mechanism, the present invention may effectively prevent traveling around of scum, and prevent degradation of treatment water quality.

BEST MODE FOR CARRYING OUT THE INVENTION

The present invention is described in detail forthwith based on attached drawings.

Figure 1:
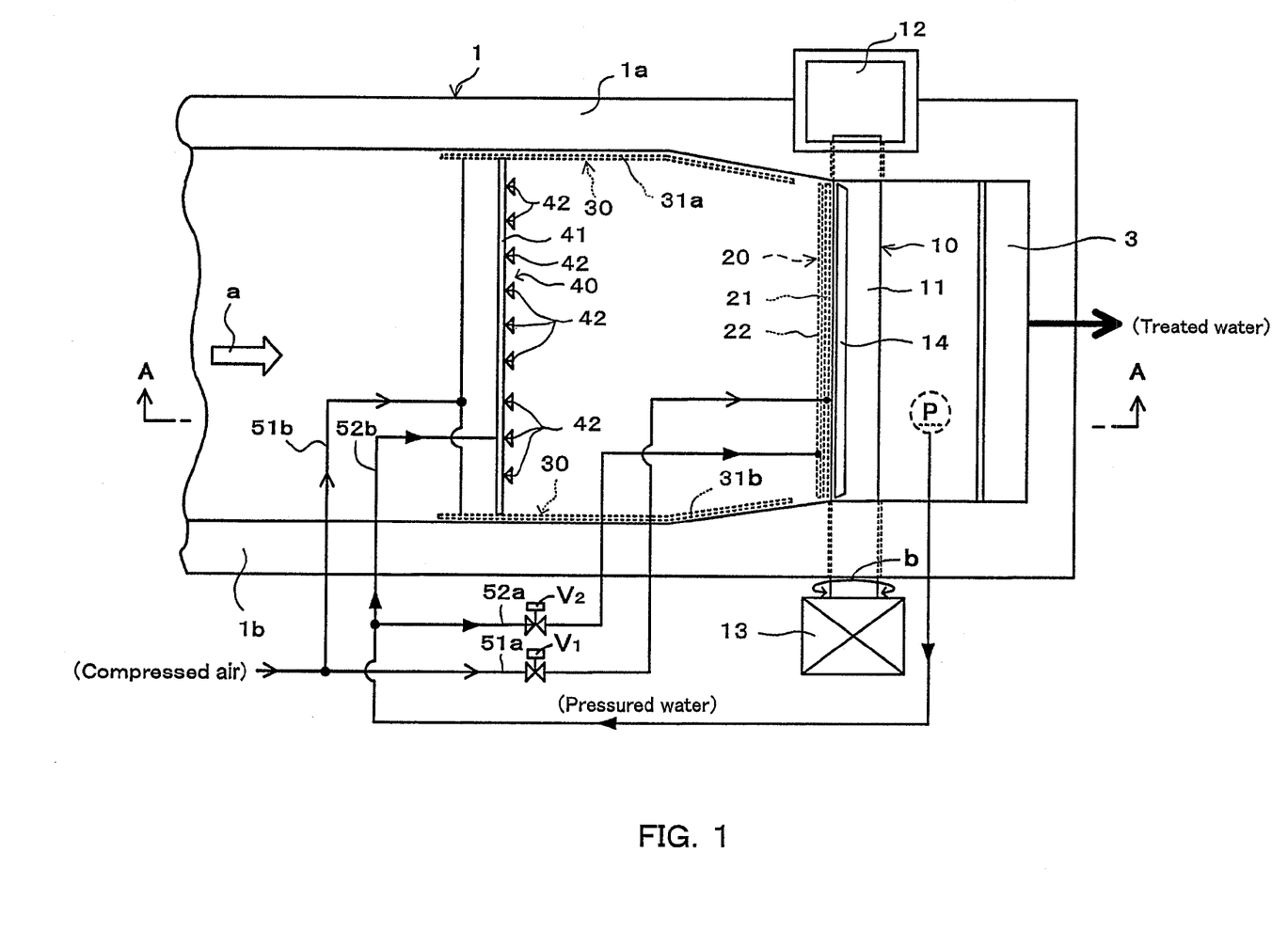
FIG. 1 is a top view of a part of a settling basin without a top cover to which is applied a scum removing apparatus according to an embodiment of the present invention.
Figure 2:
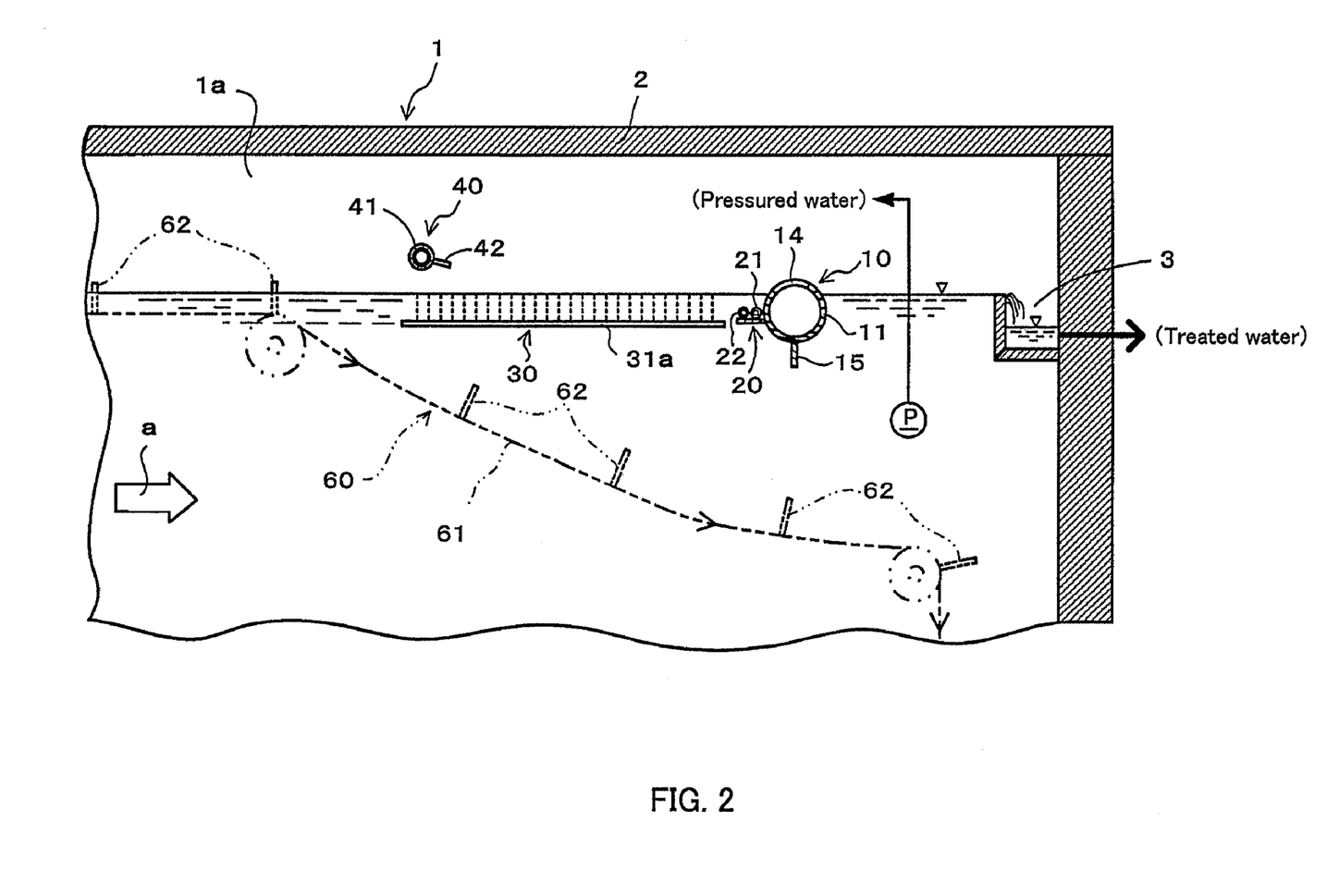
FIG. 2 is a cross section cut along the line A-A of FIG. 1.

FIG. 1 is a top view of a part of a settling basin 1 at a sewage plant to which is applied a scum removing apparatus according to an embodiment, and FIG. 2 is a cross section cut along the line A-A of FIG. 1. FIG. 1 is a view without a top cover 2 shown in FIG. 2. Note that the nature of this settling basin 1 is no object as long as it is a tank of water in which scum generates, such as a primary sedimentation tank, a final sedimentation tank, or a conduit for them at the sewage plant.

In FIG. 1 and FIG. 2, a conduit (not shown in the drawings) for raw water to flow in is provided on the right side, and an overflow trough 3 for extracting treated water is provided on the downstream side thereof. Accordingly, this illustrated example is structured such that water flows from left to right as indicated by arrow a. Moreover, this settling basin 1 is structured such that the water channel width becomes narrower on the downstream side (on the right side in the illustrated example) than on the upstream side. Furthermore, scum generating on the top surface of the settling basin 1 is omitted from FIG. 1 and FIG. 2 in order to avoid complication in the drawings. Note that this scum is indicated by symbols "S and S'" in FIGS. 9 and 10 to be described later.

In the drawings, 10 denotes a tubular scum discharging mechanism provided on the downstream side of the settling basin 1, 20 denotes a spraying means according to the present invention, 30 denotes an air spraying means according to the present invention, and 40 denotes a water spraying means according to the present invention. First, the tubular scum discharging mechanism 10, the spraying means 20, and the air spraying means 30 will be described using FIGS. 3 and 4, together with FIGS. 1 and 2.

The tubular scum discharging mechanism 10 is provided, in which a pipe 11 has a predetermined thickness such that the center of axle roughly corresponds with the water surface, and crosses over the settling basin 1. An end side (upper end side in FIG. 1) of this pipe 11 is positioned within a sump pit 12 provided on a side wall 1a (upper side wall in FIG. 1) of the settling basin 1, and a rotating mechanism 13, which is constituted by a motor and the like for rotating the pipe 11 back and forth as indicated by arrow b in FIG. 1, is provided on the other end side of the pipe 11. In addition, the pipe 11 has a slender opening 14 in the axial center direction corresponding to the scum inlet of the present invention. In the illustrated example, this opening 14 is formed with length equal to the width of the settling basin 1, and width of the opening corresponds to an approximate 90 degree angle centered around the center location of the pipe 11.

Figure 3:
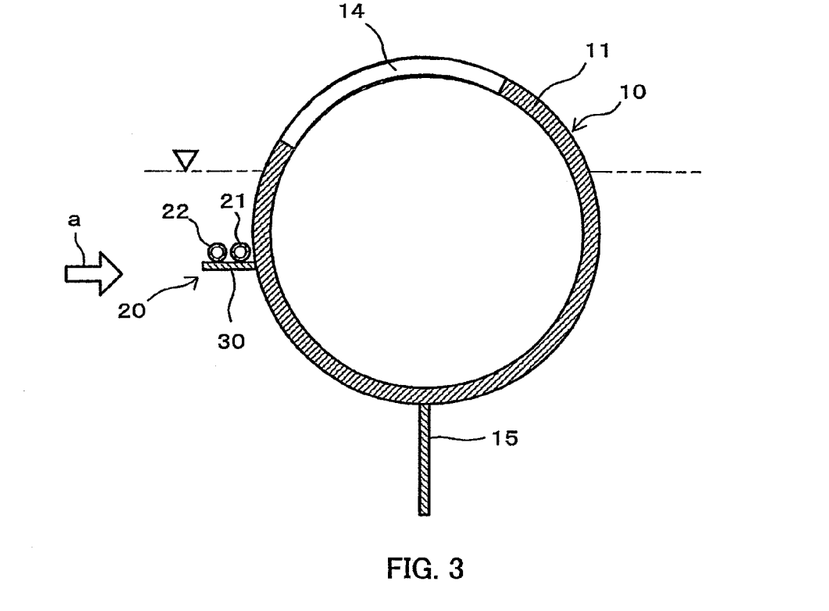
FIG. 3 is a cross section of a pipe in a state where a part of an opening of the pipe is positioned on the water surface.
Figure 4:
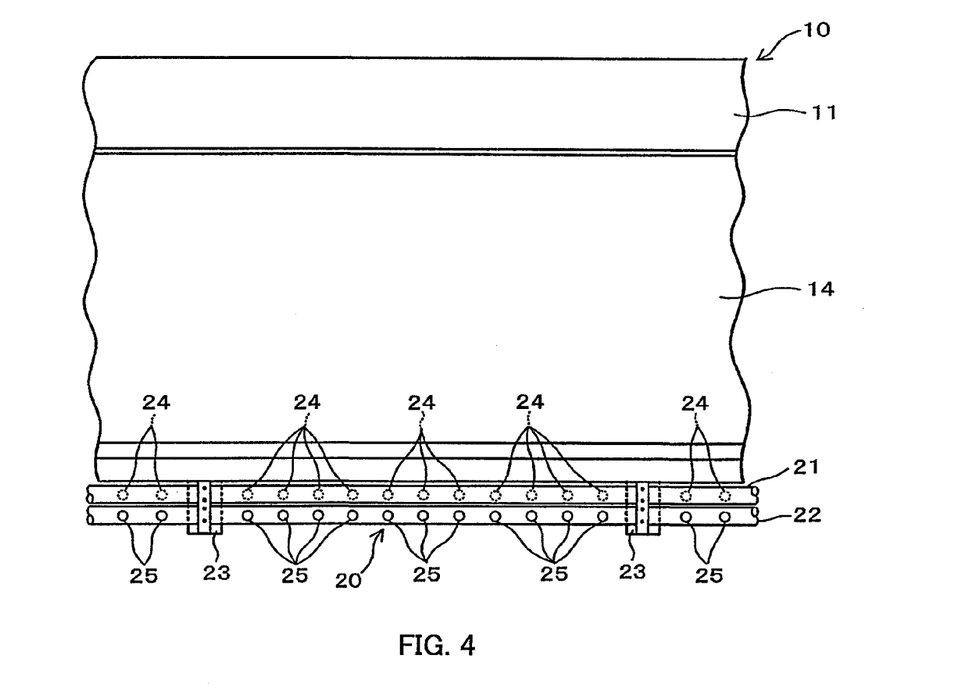
FIG. 4 is a top view of the pipe shown in FIG. 3.
Figure 9:
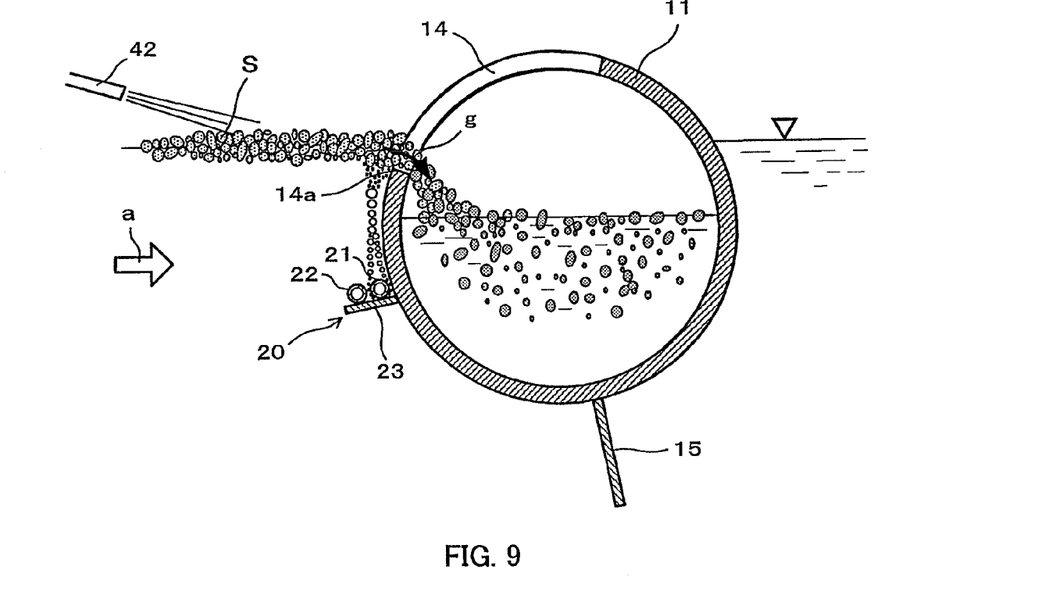
FIG. 9 is a cross section of a pipe in a state where a part of an opening of the pipe is positioned below water, and when there are no large lumps of scum exceeding 10 cm in diameter in the scum.
Figure 10:
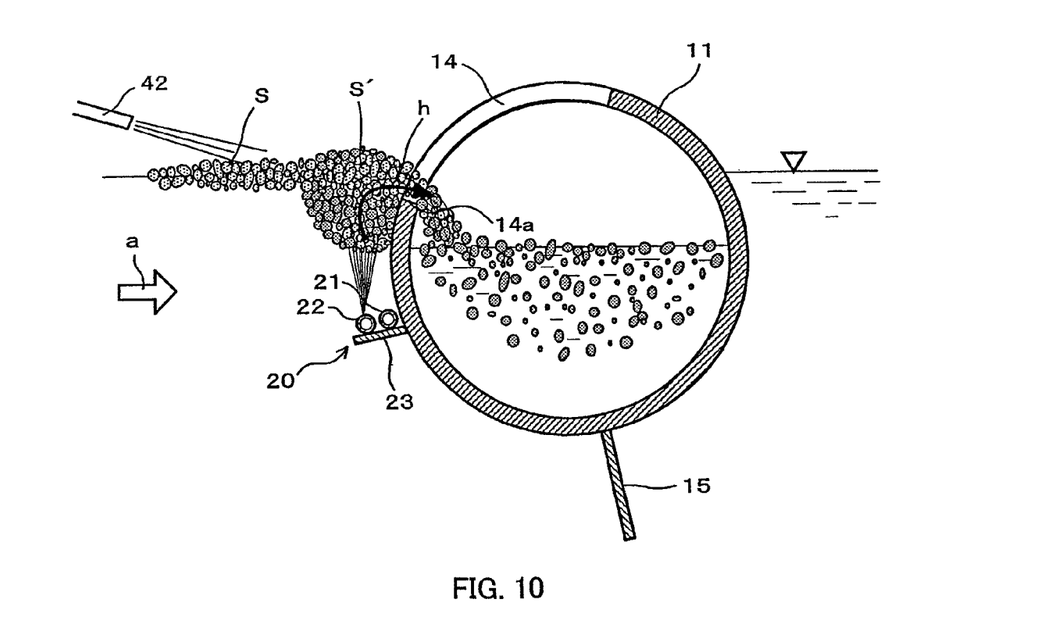
FIG. 10 is a cross section of a pipe in a state where a part of an opening of the pipe is positioned below water, and when there are large lumps of scum exceeding 10 cm in diameter in the scum.

The rotating mechanism 13 is structured, as shown in FIGS. 2 and 3, to rotate such that the opening 14 of the pipe 11 is positioned on the water surface when the pipe is not discharging scum. As shown in FIGS. 9 and 10, the rotating mechanism 13 can rotate a predetermined angle (predetermined angle in the counterclockwise direction in the example of FIGS. 9 and 10) such that a part of the opening 14 of the pip 11 is positioned below water at the time of discharging scum, which will be described later.

In FIG. 3, 15 denotes a blocking board provided at the bottom of the pipe 11. The blocking board extends, for example, approximately 30 cm from the bottom of the pipe 11 and also extends in the axial center direction of the pipe 11 for a predetermined distance. When the blocking board 15 is provided to the pipe 11 in this manner, scum flowing downstream from the lower part of the pipe 11 may be effectively prevented, and scum mixing into treated water may also be prevented. Note that while the longer this blocking board 15 extends downward, the better the effect of preventing scum from mixing into the treated water, if it is too long, it adversely affects the sedimentation effect of the settling basin, and thus the aforementioned approximate 30 cm is favorable.

The spraying means 20 includes an air spray pipe 21 made up of a synthetic resin pipe and the like for spraying compressed air, and a pressured water spray pipe 22 made up of a synthetic resin pipe and the like for spraying pressured water. Axial center direction of these pipes 21 and 22 is parallel to that of the pipe 11, and is provided via a support member 23 on the side wall (left side wall of the pipe 11 in the illustrated example) on the scum-flowing side of the pipe 11. These pipes 21 and 22 are positioned at least below the generating scum. Of these pipes 21 and 22, the air spray pipe 21 is provided closer to the pipe 11 than the pressured water spray pipe 22.

Note that the pressured water spray pipe 22 may alternatively be provided closer to the pipe 11 than the air spray pipe 21. Moreover, while these pipes 21 and 22 have been attached to the pipe 11, both end sides of these pipes 21 and 22 may be fixed and attached to basin walls 1a and 1b, respectively, without attaching them to the pipe 11. However, attaching them to the pipe 11 as illustrated is easier to attach and provides a simpler structure.

Figure 5:
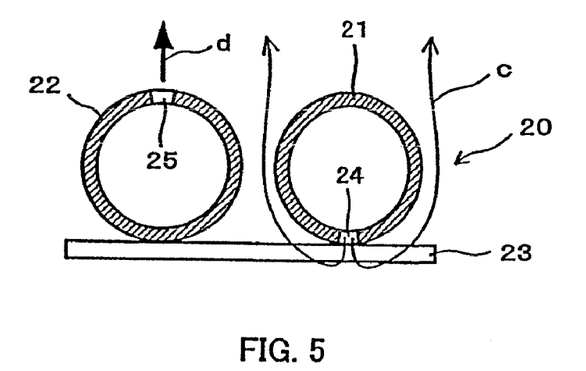
FIG. 5 is a cross section of a spraying means when small holes are formed at constant predetermined intervals along the length of the bottom of an air supply pipe.

As shown enlarged in FIG. 5, the air spray pipe 21 includes multiple small holes 24 formed in the lower portion at constant predetermined intervals along the length thereof. Compressed air is sprayed downward from these small holes 24 and is then aimed upward due to buoyancy (See arrows c in FIG. 5.) Moreover, as shown enlarged in FIG. 5, the pressured water spray pipe 22 includes multiple small holes 25 formed in the upper portion at constant predetermined intervals along the length thereof. Pressured water is delivered upward from these small holes 25 (See Arrow D in FIG. 5.)

Figure 6:
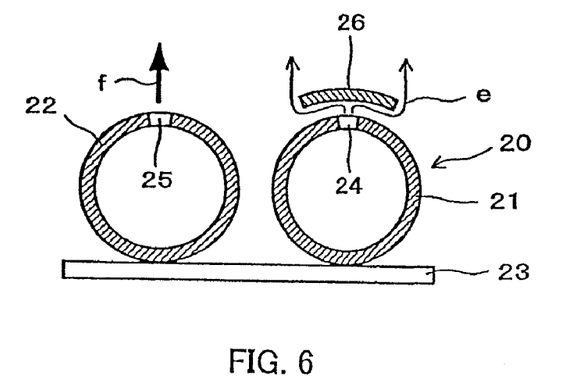
FIG. 6 is a cross section of a spraying means when small holes are formed at constant predetermined intervals along the length of the top of an air supply pipe.

FIG. 6 shows another example of the air spray pipe 21. The small holes 24 provided in the air spray pipe 21 are formed in the upper portion at constant predetermined intervals along the length thereof, and covers 26 are provided above the small holes 24, respectively, at constant predetermined intervals. As a result, air bypasses the covers 26 and rises as indicated by arrows e in FIG. 6. When the covers 26 are provided above the small holes 24, respectively, in this manner, even if the small holes 24 are provided turned upward, blockage of the small holes 24 by scum may be effectively prevented as in the case when the small holes 24 are provided turned down, as shown in FIG. 5. Note that even in FIG. 6, the pressured water spray pipe 22 is structured as in FIG. 5, and pressured water may thus by sprayed upward from the small holes 25 (See arrow f in FIG. 6.)

The air spraying means 30 includes aeration pipes 31a and 31b attached to both side walls 1a and 1b of the settling basin 1, respectively. These aeration pipes 31a and 31b are provided on the side walls 1a and 1b, respectively, via fixing brackets not shown in the drawings approximately 10 cm below the water surface of the settling basin 1, and like the air spray pipe 21, are structured with multiple small holes formed at constant predetermined intervals along the length of the pipes made of synthetic resin and the like.

In FIG. 1, 51a denotes an air supply pipe including an automatic opening and closing valve $V_1$ arranged midway for supplying compressed air from a compressed air supply source, which is not shown in the illustration, to the air spray pipe 21, and 51b denotes an air supply pipe for supplying compressed air from a compressed air supply source, which is not shown in the illustration, to the aeration pipes 31a and 31b. When the settling basin 1 is provided in a sewage plant, apart of compressed air used in an aerating tank may be used as the compressed air supply source. Needless to say that a compressor may also be installed to obtain compressed air. Note that in the illustrated example, since the air spray pipe 21 provided on the pipe 11 moves as the pipe 11 rotates, a flexible tube not shown in the drawing is provided at the connecting part of the air supply pipe 51a and the air spray pipe 21.

The water spraying means 40 includes a header pipe 41, which is positioned (position a little more upstream from the portion where the width of the settling basin 1 narrows in the illustrated example) a predetermined distance further upstream than the tubular scum discharging mechanism 10, and extends in a direction orthogonal to the water flow of the settling basin 1. Moreover, the header pipe 41 has multiple nozzles 42 provided at constant predetermined intervals along the length thereof. Each of the nozzles 42 is structured so as to spray pressured water toward the tubular scum discharging mechanism 10, namely toward downstream of the settling basin 1.

Figure 7:
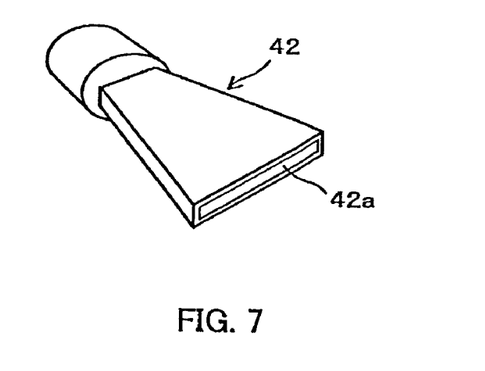
FIG. 7 is a perspective view of a nozzle.

As shown in FIG. 7, each of the nozzles 42 is formed with a flat and broadening outer shape, and is structured so as to spray membranous pressured water from respective slits 42*a* formed in broadening end surfaces thereof, respectively. As a result, pressured water may be dispersed from each of the nozzles 42 across a wide area of scum, and the scum may be efficiently moved toward the tubular scum discharging mechanism 10.

In FIG. 1, 52*a* denotes a pressured water supply pipe including an automatic opening and closing valve $V_2$ arranged midway for supplying pressured water pumped up by a pump P from a middle layer further downstream than the installed position of the tubular scum discharging mechanism 10 to the pressured water spray pipe 22, and 52*b* denotes a pressured water supply pipe for supplying pressured water pumped up by the pump P to the header pipe 41.

In FIG. 2, 60 denotes a sludge collecting mechanism of the settling basin 1, and is structured with collective plates 62 provided at constant predetermined intervals on an endless chain conveyer 61. This sludge collecting mechanism 60 is structured so as to discharge to a pit not shown in the drawing, sludge (sediment) piled up at the bottom of the settling basin 1 on the forward moving side of the chain conveyer 61, and so as to transfer the scum to the tubular scum discharging mechanism 10 on the backward moving side of the chain conveyer 61.

Figure 8:
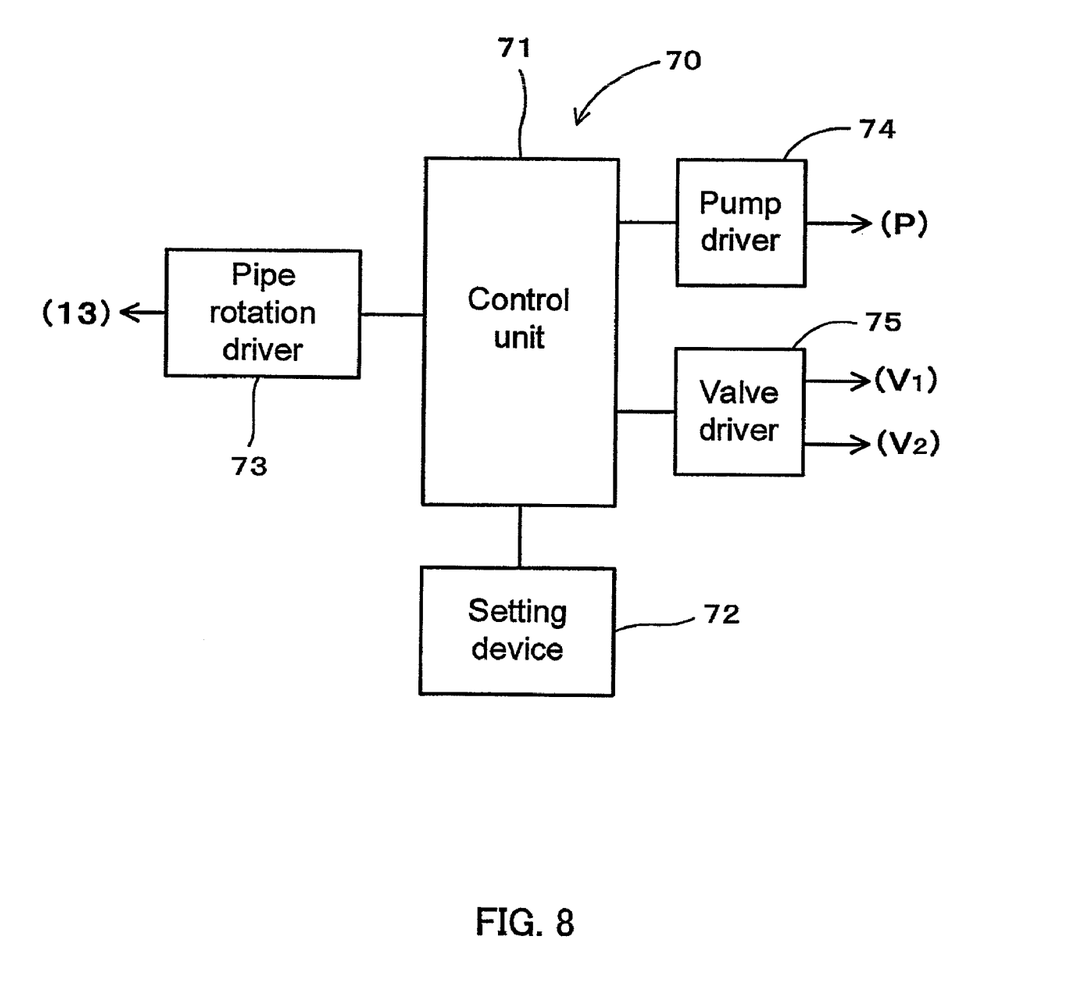
FIG. 8 is a block diagram of a controller.

FIG. 8 is a block diagram of a controller 70 constituted by a program controller for managing control of driving the scum removing apparatus. The controller 70 includes a control unit 71 mainly constituted by a CPU. This control unit 71 is connected to a setting device 72, which sets rotating times of the pipe 11 and opening and closing times of the automatic opening and closing valves $V_1$ and $V_2$, and selects and sets for the scum removing apparatus normal mode for times other than during heavy rain, heavy rain mode for during heavy rain (includes during heavy rain and a predetermined period thereafter), and other various modes; a pipe rotation driver 73, which controls driving of a motor of the rotating mechanism 13 to drive the rotation of the pipe 11; a pump driver 74, which controls driving of the pump P; and a valve driver 75, which controls driving of the automatic opening and closing valves $V_1$ and $V_2$.

The scum discharging operations of the scum removing apparatus with the aforementioned configuration will be described using the explanatory drawings FIGS. 9 and 10 and the time charts FIGS. 11A, 11B, and 11C. FIG. 9 and FIG. 10 respectively show a state where it is time for discharging scum, the pipe 11 rotates a predetermined angle from the position of FIG. 3 in the anticlockwise direction so that edge (rim) 14*a* on the upstream side (left side in the illustrated examples) of the opening 14 is positioned below water at a predetermined depth. Moreover, FIG. 9 shows a normal state other than during heavy rain where generating scum S has a thickness of 10 cm or less. On the other hand, FIG. 10 shows a state during heavy rain where the generating scum S includes large lumps of scum S' of thickness (diameter) exceeding 10 cm. Furthermore, FIG. 11A shows a time chart for normal mode not during heavy rain, and FIGS. 11B and 11C show time charts for heavy rain mode.

Assume it is not during heavy rain now. In this case, the scum removing apparatus is set to normal mode via the setting device 72. Here, until it becomes time to discharge the scum S, the opening 14 of the pipe 11 of the tubular scum discharging mechanism 10 is positioned on the water surface, as shown in FIG. 3. As a result, since the scum S is not discharged from the pipe 11, it gradually accumulates plate-like on the upstream side of the pipe 11. Moreover, compressed air is regularly supplied from the aeration pipes 31*a* and 31*b* to spray air bubbles along both of the side walls 1*a* and 1*b* of the settling basin 1, and accordingly, a state where no scum S is attached (adhered) to both of the side walls 1*a* and 1*b*, namely lumps of plate-like scum S are all floating on the water surface is maintained.

Figure 11A:
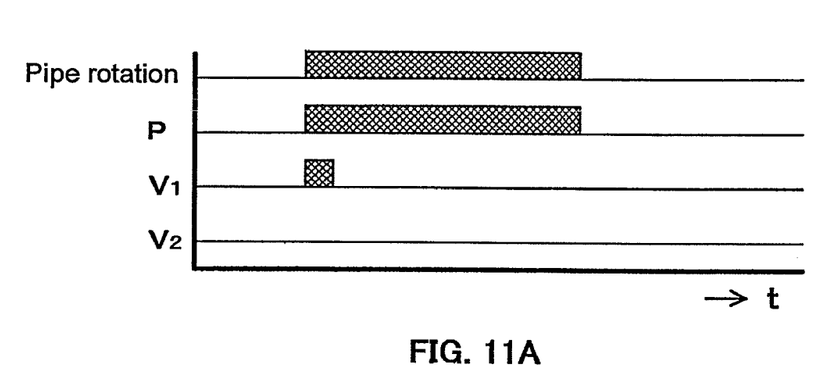
FIGS. 11A to 11C are time charts showing control action.
Figure 11B:
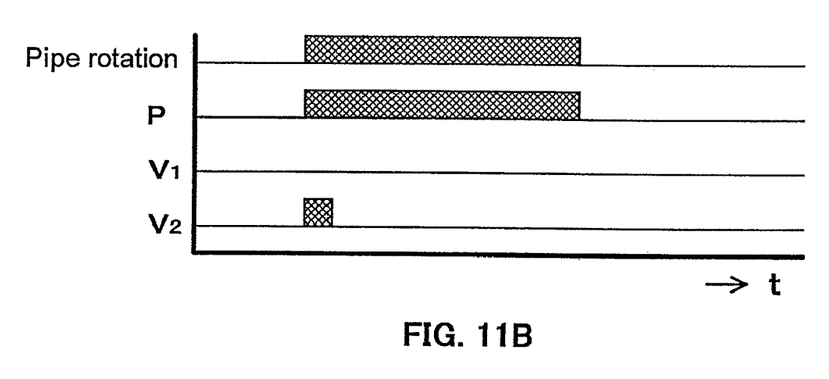
Figure 11C:
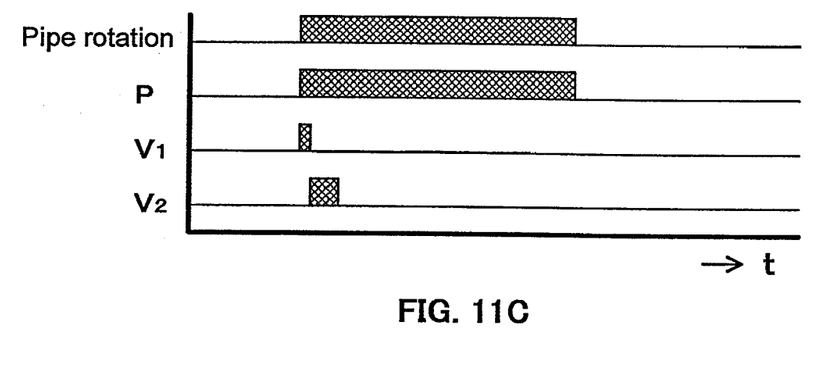

Next, when it becomes time to discharge the scum S, for example, when one week elapses from the previous scum discharge time, as shown in FIG. 11A, the pipe 11 rotates by the rotating mechanism 13 for a predetermined duration (for example, 10 minutes) so that a part of the opening 14 is submerged in water (See FIG. 9.) When a part of the opening 14 of the pipe 11 is submerged in water, the water spraying means 40 also begins driving at the same time to spray pressured water from the nozzles 42 on the scum S. As a result, moving the scum S to the tubular scum discharging mechanism 10 is expedited by locomotive faculty imparted from the pressured water in addition to the scum movement due to water flow (see arrow a) in the settling basin 1.

Moreover, the automatic opening and closing valve $V_1$ is opened for a predetermined duration (for example, 30 seconds) at the same time that a part of the opening 14 of the pipe 11 is submerged in water so as to spray air from the air spray pipe 21. Due to this sprayed air, the scum S in the vicinity of the opening 14 of the pipe 11 is raised by air bubbles, and the raised scum S passes over the end 14*a* of the opening 14 and is lead smoothly into the pipe 11. Once the scum S has entered the pipe 11 from the opening 14, all of subsequent scum S is lead smoothly into the pipe 11. It is sufficient for introduction of the scum S into the opening 14 by spraying of air to be carried out for a very short time of approximately 30 seconds since scum will continue to be lead smoothly into the pipe 11 by the flowing force of the scum S thereafter. Since air needs to be sprayed for only a short period as such, scum discharge may be possible at a lower cost.

Furthermore, since the scum S is completely separated from both of the side walls 1*a* and 1*b* due to air bubbles from the aeration pipes 31*a* and 31*b* in this scum discharging process, movement of all of the scum is carried out smoothly so that all of the scum moves rapidly into the pipe 11 from the opening 14. Therefore, with this scum removing apparatus, an exceptional result of allowing amount of water taken into the pipe 11 for discharging all of the scum S to be reduced to ⅟₂₀ to ⅟₃₀ when all of the scum S is discharged by driving only the water spraying means 40 may be attained.

The scum S taken into the pipe 11 is lead into the sump pit 12, delivered to a scum processing unit, which is not shown in the drawing, including a hydro-extractor or the like, and then processed. Since amount of water included in the scum S is very little, processing cost may be lowered even with this scum processing unit.

After the scum S is taken into the pipe 11 and removed from the water surface of the settling basin 1, the pipe 11 is rotated via the rotating mechanism 13 to the original position, that is, the opening 14 of the pipe 11 is positioned on the water surface (See FIG. 3), and driving of the water spraying means 30 is stopped, thereby completing the sequence of scum discharging operations.

Next, the case of during heavy rain will be described. In this case, the scum removing apparatus is set to heavy rain mode via the setting device 72. Here, the opening 14 of the pipe 11 is positioned on the water surface until it is time for discharging the scum S, and the scum S is gradually accumulated plate-like on the upstream side of the pipe 11 since it is not discharged from the pipe 11. The scum S includes large lumps of scum S' exceeding 10 cm in diameter that have stripped away from sewage pipe inner surfaces and the like due to water flow and water pressure during heavy rain. Note that even in this case, compressed air is regularly supplied from the aeration pipes 31a and 31b to spray air bubbles along both of the side walls 1a and 1b of the settling basin 1, and accordingly, a state where no scum S is attached (adhered) to either of the side walls 1a and 1b, namely lumps of platy scum S are all floating on the water surface is maintained.

When it becomes time to discharge the scum S, for example, as shown in FIG. 11B, the pipe 11 rotates by the rotating mechanism 13 for a predetermined duration (for example, 10 minutes) so that a part of the opening 14 is submerged in water (See FIG. 10.) When a part of the opening 14 of the pipe 11 is submerged in water, the water spraying means 40 also begins driving at the same time to spray pressured water from the nozzles 42 on the scum S. As a result, moving the scum S and S' to the tubular scum discharging mechanism 10 is expedited by locomotive faculty imparted from the pressured water in addition to the scum movement due to water flow (see arrow a) in the settling basin 1.

Moreover, the automatic opening and closing valve $V_2$ is opened for a predetermined duration (for example, 30 seconds) at the same time that a part of the opening 14 of the pipe 11 is submerged in water so as to spray pressured water from the pressured water spray pipe 22. Due to this sprayed pressured water, the scum S' in the vicinity of the opening 14 of the pipe 11 is raised by the sprayed flow of water, and the scum S' passes over the end 14a of the opening 14 and is lead smoothly into the pipe 11 (See arrow h in FIG. 10.) Once the scum S' has entered the pipe 11 from the opening 14, all of subsequent scum S and S' is lead smoothly into the pipe 11. It is sufficient for introduction of the scum S into the opening 14 by spraying of pressured water to be carried out for a very short time of approximately 30 seconds since scum will continue to be lead smoothly into the pipe 11 by the flowing force of the scum S thereafter. Since pressured water needs to be sprayed for only a short period as such, scum discharge may be possible at a lower cost.

Furthermore, since the scum S and S' is completely away from either of the side walls 1a and 1b due to air bubbles from the aeration pipes 31a and 31b in this scum discharging process, moving all of the scum is carried out smoothly so as to rapidly move into the pipe 11 from the opening 14.

The scum discharging operation of the time chart shown in FIG. 11C has an additional operation of releasing air from the air spray pipe 21 of the scum discharging operation shown in the aforementioned FIG. 11B. More specifically, in this air emitting operation, the automatic opening and closing valve $V_1$ is opened for a predetermined duration (for example, 10 seconds) at the same time that a part of the opening 14 of the pipe 11 is submerged in water so as to spray air from the air spray pipe 21. After the scum S and S' adhered to the pipe 11 is effectively stripped away from the pipe 11 by the sprayed air, the automatic opening and closing valve $V_2$ is opened for a predetermined duration (for example, 30 seconds) so as to spray pressured water from the pressured water spray pipe 22. Due to this sprayed pressured water, the scum S and S' in the vicinity of the opening 14 of the pipe 11 is raised by the sprayed flow of water, and the scum S and S' passes over the end 14a of the opening 14 and is lead smoothly into the pipe 11.

As such, even if the scum S generating in the settling basin 1 includes large lumps of scum S' exceeding 10 cm in thickness (diameter), since it is lead smoothly into the pipe 11 by the water flow sprayed from the pressured water spray pipe 22, even the conventional scum removing apparatus, which discharges scum by driving only the conventional water spraying means, may attain an exceptional result of reducing the amount of discharged water accompanying scum discharge to 1/20 to 1/30.

Figure 12:
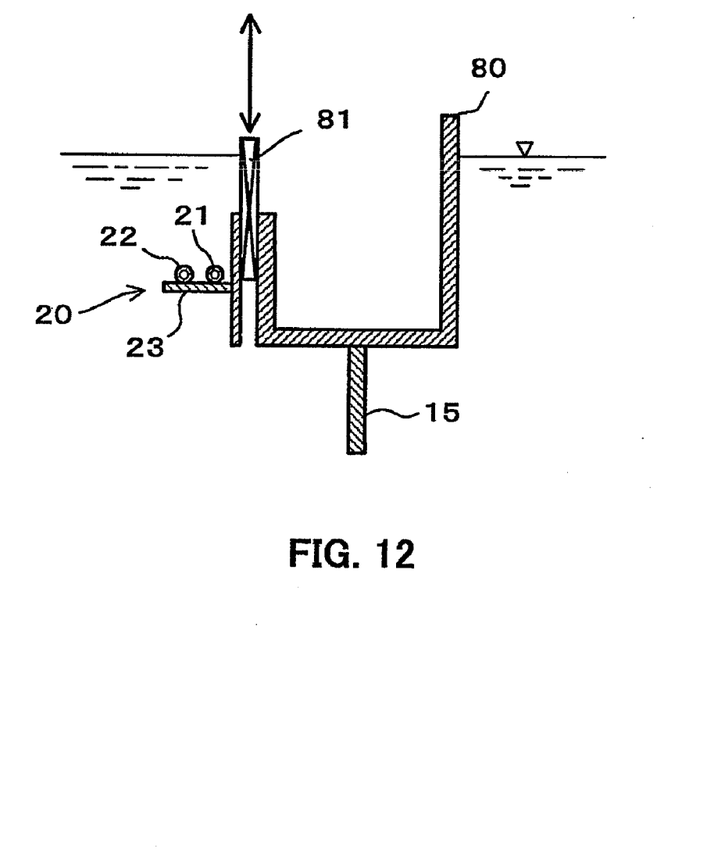
FIG. 12 is an explanatory drawing for when a trough-type scum discharging mechanism is implemented in the scum removing apparatus according to the present invention.
Figure 13:
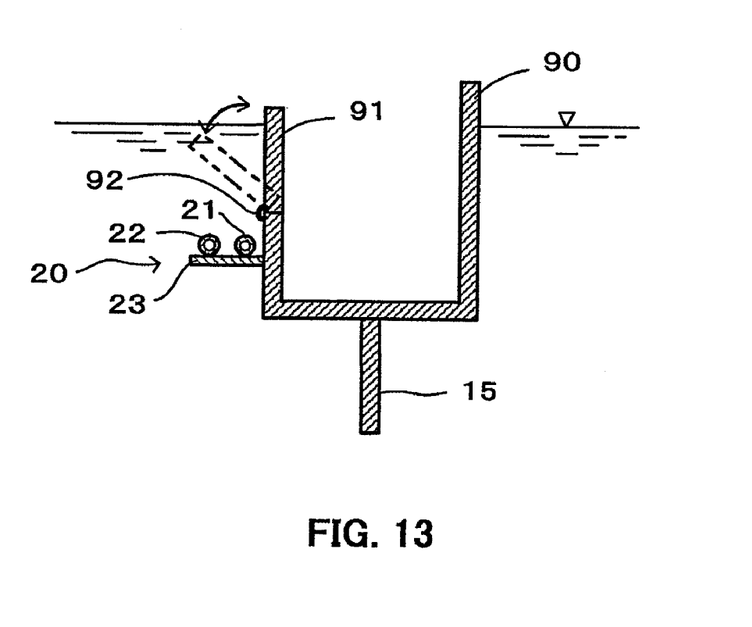
FIG. 13 is an explanatory drawing for when another form of trough-type scum discharging mechanism is implemented in the scum removing apparatus according to the present invention.

FIG. 12 and FIG. 13 show the scum removing apparatus according to the present invention implemented by a trough-type scum discharging mechanism. FIG. 12 is structured with a vertically moving inflow floodgate 81 provided on the upstream side (on the left side in FIG. 12) of a trough 80, which is for taking in scum. The spraying means 20, which includes the air spray pipe 21 and the pressured water spray pipe 22, is provided on the upstream side of this inflow floodgate 81 via the supporting member 23. Moreover, the same blocking board 15 provided to the aforementioned pipe 11 is provided on the bottom of this trough 80.

Meanwhile, FIG. 13 shows the scum discharging mechanism of the scum removing apparatus according to the present invention implemented by another form of trough-type scum discharging mechanism. This trough-type scum discharging mechanism is provided with a side wall upper portion 91, which is on the upstream side of a trough 90 for taking in scum, freely rotatable via a hinge 92. It is structured such that when scum is taken in, it is rotated to submerge the upper end of the side wall upper portion 91 in the water so as to bring the scum into the trough 90. In the same way as with the aforementioned trough 80, the spraying means 20 is also provided on the upstream side of the trough 90, and the same stopping board 15 as with the trough 80 is provided on the bottom of this trough 90.

In the case of using such trough-type scum discharging mechanisms for the scum discharging mechanism, the pipe rotation driver 73 of the control unit 70 is a driver for either vertically moving the inflow floodgate 81 or rotating the side wall upper portion 91.

Experimental Example

A scum discharging experiment has been conducted in an actual settling basin of a sewage plant during heavy rain. A tubular scum discharging mechanism including the spraying means 20 shown in FIG. 6 is installed in the settling basin of this experiment. Large lumps of scum exceeding 10 cm in thickness (diameter) existed on the upstream side of the tubular scum discharging mechanism during heavy rain. When pressured water was sprayed for 30 seconds from a pressured water spray pipe of the spraying means at the time of discharging scum, large lumps of scum could easily be raised to the position of the edge of the pipe opening, and discharging the scum thereafter could be performed smoothly. On the other hand, when only air is sprayed from the spraying means, large lumps of scum could not be raised to the position of the edge of the pipe opening, and there was trouble in discharging the scum thereafter.

INDUSTRIAL APPLICABILITY

Not only is the scum removing apparatus according to the present invention used in sewage plants, but it is also applicable in water tanks generating scum in wastewater processing facilities for various types of industrial wastewater and the like. Moreover, it is also applicable when making valuable resources surface and separating them in a food factory, chemical factory, etc. Consequently, 'water' with the present invention means not only sewage water or wastewater but also various liquids.

The invention claimed is:

1. A scum removing apparatus, which transfers generated scum on a current to a scum discharging mechanism side, and has a part of a scum inlet of the scum discharging mechanism submerged in water at the time of discharging scum so as to remove the generated scum;

said scum removing apparatus comprising:
a pressured water spraying device provided on the scum-flowing wall surface side of wall surfaces forming the scum inlet of the scum discharging mechanism; and
a controller for controlling the scum discharging mechanism in accordance with a predetermined operation mode; wherein the controller activates the pressured water spraying device for a predetermined duration so that pressured water is sprayed vertically upward in water along the wall surface on the scum-flowing side from when a part of the scum inlet is submerged in water by the control of the controller until the scum begins to flow into the scum inlet; and wherein said predetermined duration is shorter than a duration of the submerging of the scum inlet.

2. The scum removing apparatus according to claim 1, further comprising an air spraying device, which is provided in the water near a basin wall further upstream than the position at which the scum discharging mechanism is provided, wherein the air spraying device sprays air vertically upward along the basin wall by the control of the controller.

3. The scum removing apparatus according to claim 2, wherein the controller controls said air spraying device so that air is sprayed regularly.

4. The scum removing apparatus according to claim 3, further comprising a water spraying device, which is provided further upstream than the position at which the scum discharging mechanism is provided, wherein the water spraying device sprays water obliquely downward on the scum discharging mechanism side at the time of discharging scum to transfer the scum to the scum discharging mechanism side by the spraying pressure of the water.

5. The scum removing apparatus according to claim 4, wherein said scum discharging mechanism is a tubular scum discharging mechanism, which comprises a pipe having an axial center direction parallel to the water surface, including a slender opening in the axial center direction and being rotatable with the axis as a center by the control of the controller, and introduces scum into the pipe from the opening when a part of the opening is positioned below water, or said scum discharging mechanism is a trough-type scum discharging mechanism, which introduces scum from an inflow floodgate moving vertically by the control of the controller into the trough when the upper part of the inflow floodgate is positioned below water.

6. The scum removing apparatus according to claim 5, further comprising a blocking board, which either extends downward for a predetermined distance along the length of the bottom of a pipe of said tubular scum discharging mechanism, or extends downward for a predetermined distance along the length of the bottom of a trough of said trough-type scum discharging mechanism.

7. The scum removing apparatus according to claim 6, wherein spraying of water by said water spraying device is performed from nozzles formed with a flat and broadening outer shape, and structured so as to pump up water from a middle layer in the basin.

8. A scum removing apparatus, which transfers generated scum on a current to a scum discharging mechanism side, and has a part of a scum inlet of the scum discharging mechanism submerged in water at the time of discharging scum so as to remove the generated scum;

said scum removing apparatus comprising:
a pressured water spraying device provided on the scum-flowing wall surface side of wall surfaces forming the scum inlet of the scum discharging mechanism;
a compressed air spraying device provided in parallel with the pressured water spraying device; and
a controller for controlling the scum discharging mechanism in accordance with a predetermined operation mode;
wherein the controller controls driving of the compressed air spraying device so as to spray compressed air in water along the wall surface on the scum-flowing side for a predetermined period, and the controller subsequently controls driving of the pressured water spraying device so that pressured water is sprayed vertically upward in water along the wall surface on the scum-flowing side, from when a part of the scum inlet is submerged in water by the control of the controller until the scum begins to flow into the scum inlet.

9. The scum removing apparatus according to claim 8, further comprising an air spraying device, which is provided in the water near a basin wall further upstream than the position at which the scum discharging mechanism is provided, wherein the air spraying device sprays air vertically upward along the basin wall by the control of the controller.

10. The scum removing apparatus according to claim 9, wherein the controller controls air by said air spraying device so that air is sprayed regularly.

11. The scum removing apparatus according to claim 10, further comprising a water spraying device, which is provided further upstream than the position at which the scum discharging mechanism is provided, wherein the water spraying device sprays water obliquely downward on the scum discharging mechanism side at the time of discharging scum to transfer the scum to the scum discharging mechanism side by the spraying pressure of the water.

12. The scum removing apparatus according to claim 11, wherein said scum discharging mechanism is a tubular scum discharging mechanism, which comprises a pipe having an axial center direction parallel to the water surface, including a slender opening in the axial center direction and being rotatable with the axis as a center by the control of the controller, and introduces scum into the pipe from the opening when a part of the opening is positioned below water, or said scum discharging mechanism is a trough-type scum discharging mechanism, which introduces scum from an inflow floodgate moving vertically by the control of the controller into the trough when the upper part of the inflow floodgate is positioned below water.

13. The scum removing apparatus according to claim 12, further comprising a blocking board, which either extends downward for a predetermined distance along the length of the bottom of a pipe of said tubular scum discharging mechanism, or extends downward for a predetermined distance along the length of the bottom of a trough of said trough-type scum discharging mechanism.

14. The scum removing apparatus according to claim 13, wherein spraying of compressed air by said compressed air spraying device is performed from small holes formed in the lower portion of an air supply pipe at constant predetermined intervals along the length thereof.

15. The scum removing apparatus according to claim 13, wherein said compressed air spraying device comprises small holes formed in the upper portion of an air supply pipe at constant predetermined intervals along the length thereof, and covers provided above the small holes at constant predetermined intervals, wherein compressed air sprayed by the compressed air spraying device bypasses the covers and rises upward.

16. The scum removing apparatus according to claim 15, wherein spraying of water by said water spraying device is performed from nozzles formed with a flat and broadening outer shape, and structured so as to pump up water from a middle layer in the basin.

* * * * *